United States Patent [19]
Yoshimura et al.

[11] Patent Number: 5,748,183
[45] Date of Patent: May 5, 1998

[54] INFORMATION PROCESSING APPARATUS

[75] Inventors: Yuichiro Yoshimura, Kamakura; Atsushi Tanaka, Kawasaki; Ryozo Yanagisawa, Chiba-ken; Katsuyuki Kobayashi, Yokohama; Masaki Tokioka, Fujisawa; Hajime Sato, Yokohama, all of Japan

[73] Assignee: Canon Kabushiki Kaisha, Tokyo, Japan

[21] Appl. No.: 499,008

[22] Filed: Jul. 6, 1995

[30] Foreign Application Priority Data

Jul. 7, 1994 [JP] Japan ................... 6-156166

[51] Int. Cl.$^6$ ................................ G09G 5/00
[52] U.S. Cl. ............... 345/173; 348/744; 349/6
[58] Field of Search ............. 345/87, 173; 348/744, 348/745; 349/5, 6, 11

[56] References Cited

U.S. PATENT DOCUMENTS

| | | | |
|---|---|---|---|
| 4,886,943 | 12/1989 | Suzuki et al. | 345/173 |
| 4,932,332 | 6/1990 | Noda | 108/50 |
| 5,432,304 | 7/1995 | Tanahashi | 345/182 |
| 5,444,506 | 8/1995 | Nakazawa et al. | 353/104 |
| 5,489,924 | 2/1996 | Shima et al. | 345/173 |
| 5,568,279 | 10/1996 | Hinman et al. | 345/2 |

FOREIGN PATENT DOCUMENTS

| | | |
|---|---|---|
| 0532200A2 | 3/1993 | European Pat. Off. . |
| 0568161A1 | 11/1993 | European Pat. Off. . |

*Primary Examiner*—Richard Hjerpe
*Assistant Examiner*—Xu-Ming Wu
*Attorney, Agent, or Firm*—Fitzpatrick, Cella, Harper & Scinto

[57] ABSTRACT

A highly portable information processing apparatus projects a hand-written input image in real time while the projected image is not hindered by the hand-writing operation. An image to be projected is displayed on a transmission type liquid crystal display provided in a main control unit and a light beam is projected from the bottom thereof. The light beam passes through lenses and is projected to a coordinate input plate and reflected thereby, passes through lenses, is reflected by a reflection plate and then projected to a screen. The coordinate input plate allows the viewing of the projected image from a plane opposite to the projection plane so that an operator may point a desired coordinate while watching the image. The pointed coordinate is displayed by a main control unit on the liquid crystal screen as an image. The projected light is not intercepted by an obstacle in a path to projection on the screen.

9 Claims, 6 Drawing Sheets

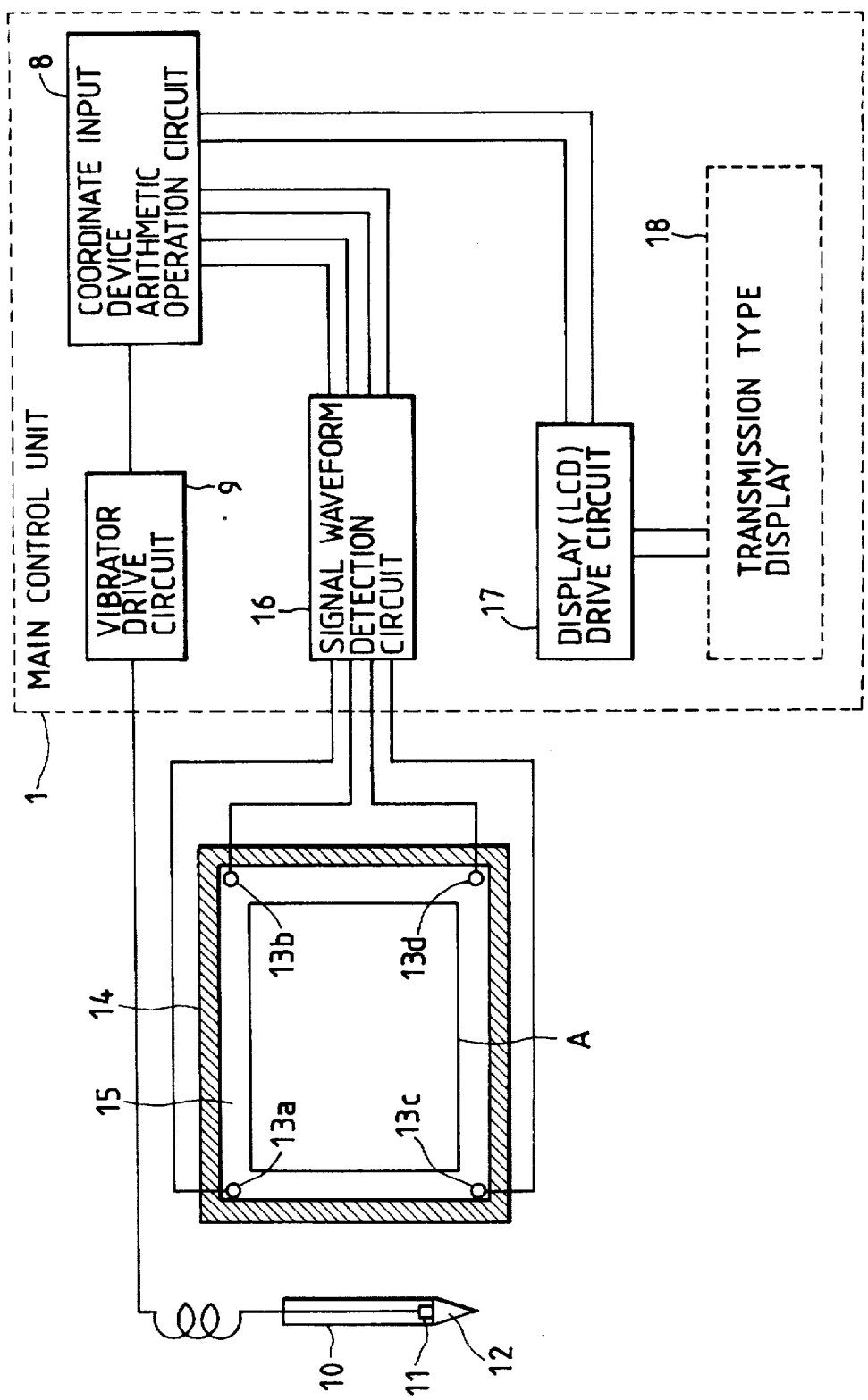

INFORMATION PROCESSING APPARATUS

BACKGROUND OF THE INVENTION

1. Field of the Invention

The present invention relates to an information processing apparatus for displaying, or enlarge-projecting, input information or arithmetic operation information.

2. Related Background Art

In order to effectively convey information to an audience in the presentation of a lecture or conference, an image projector such as a slide projector or an overhead projector (OHP) as shown in FIG. 7 has been used as an auxiliary equipment.

Recently, a projector which transmittedly projects a liquid crystal display screen of a computer as shown in FIG. 8 has been used.

A presentator appropriately points a screen of the equipment or writes thereon during the presentation and proceeds while exchanging the materials as the story develops.

However, in the former (FIG. 7) of the prior art, transparent materials must be prepared previously and the materials prepared by a word processor should be printed out and transferred to dedicated transparent films. Where the number of sheets of materials is large, the exchange of the sheets is troublesome and in some cases, the presentator (presenter) has to ask for help from an assistant. Further, when the presentator points or writes on the sheet to add explanation to the material, a shadow of the hand is projected and the correction or erasure is not attained.

In the latter (FIG. 8) of the prior art, the work to prepare the sheets of materials may be eliminated but inconvenience is present in the presentation. Although it may change depending on a particular system, when a prestored image is to be projected, addition of information to the image during the presentation is not attained and a shadow of the hand is projected when the screen is pointed. In another system in which an input/output integrated tablet is provided separately from the screen for projection, addition of information to the screen during the presentation may be attained but the equipment and the system are of large scale and they may be appropriate as an apparatus to be used in a television conference system but not appropriate as a general purpose and portable apparatus for presentation.

SUMMARY OF THE INVENTION

It is an object of the present invention to provide an information processing apparatus which does not need previous preparation of a sheet material, allows pointing or writing to add explanation to the material without projecting a shadow of the hand of the presentator, does not require connection with other projector equipment, is highly generally usable and highly portable, and is foldable so that it may be used as a conventional input/output integrated information processing apparatus when it is not used for presentation and makes it possible to prepare the material and present it by a single apparatus.

It is another object of the present invention to provide an input/output integrated information processing apparatus which has a small parallax between a pointing point by a pen and a display screen by forming an input screen by an image projection screen and which has no display obstacle such as wires on an input plate.

In order to achieve the above object, the information processing apparatus of the present invention is characterized in that an image is displayed on a light transmitting image display unit, the light transmitting image display unit is illuminated to project an image, the projected image is focused on a half-mirror plate and reflected thereby, coordinates are inputted through the plate, an image formed by the input coordinates is displayed on the light transmitting image display unit, and the image reflected by the plate is focused on a predetermined projection plane.

Further, an optical system for focusing the projected image is arranged between the light transmitting image display unit and the plate and the optical system variably magnifies the focused image.

The size of the image inputted to the plate and the size of the image displayed are adjusted in accordance with the size of the variably magnified image.

The plate may be drawn out and in and the state of draw is detected to control the display of the image.

The plate is a vibration transmitting plate so that a vibration applied to the plate is detected at a predetermined position to input the coordinate in accordance with a delay time from the input to the detection of the vibration.

Alternatively, the plate is a lamination of resistor films so that a resistance thereof changes by pressing a desired point and it is detected to input the coordinate.

With those arrangements, the pointing or the writing to the material-to add explanation is attained in the presentation equipment for the lecture or the conference without need for preparing a sheet material previously and without projecting the shadow of the hand of the presentator, and a general purpose and portable information processing apparatus is provided. Further, since the information processing apparatus of the present invention is foldable, it may be used as a conventional input/output integrated information processing apparatus when it is not used for the presentation.

BRIEF DESCRIPTION OF THE DRAWINGS

FIG. 3 shows a block diagram of a coordinate input device.

DETAILED DESCRIPTION OF THE PREFERRED EMBODIMENTS

Embodiments of the present invention are now explained in detail with reference to the accompanying drawings.

[First Embodiment]

Figure 1A:
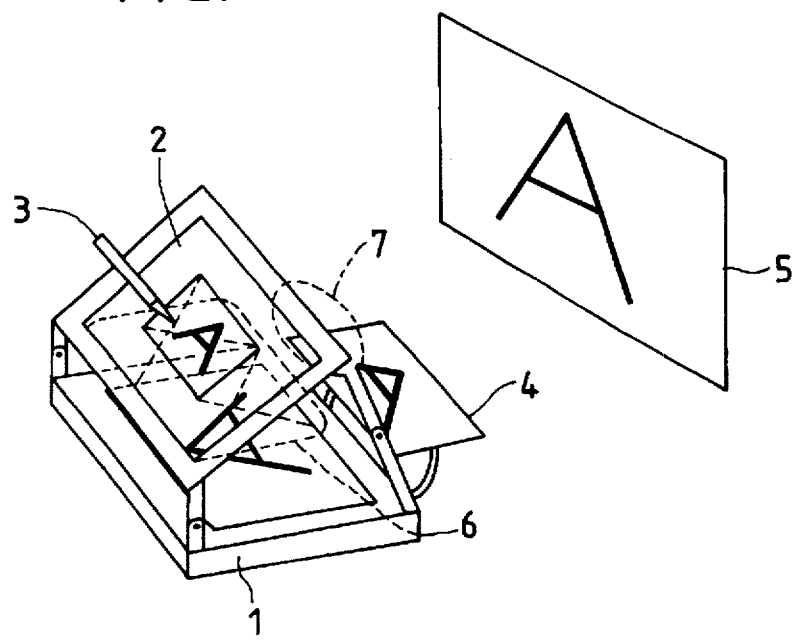
FIGS. 1A, 1B and 1C show configurations of an embodiment of the present invention.
Figure 1B:
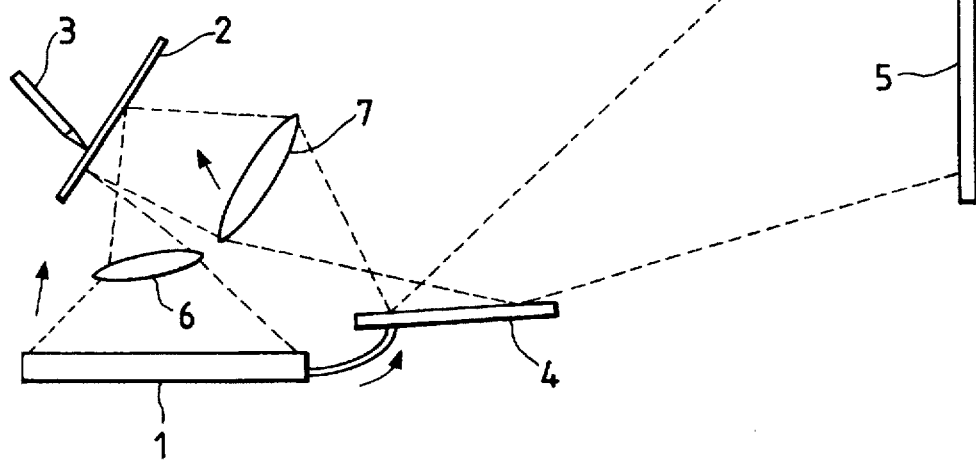
Figure 1C:
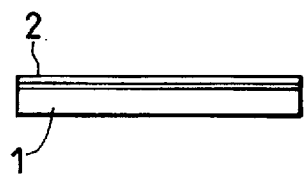

FIG. 1A shows a perspective view of the overall information processing system of the present embodiment, FIG. 1B shows a side view of the apparatus when an image is projected by the apparatus, and FIG. 1C shows a side view when the apparatus is used as an information processing apparatus (in a folded state).

In FIGS. 1A, 1B and 1C, numeral 1 denotes a main control unit including a liquid crystal display. The main control unit 1 comprises a transmission type liquid crystal display for displaying image information from an input plane to be described later and other stored and arithmetic operation information and an arithmetic operation unit for arithmetically operating input coordinates and performing other arithmetic operations. It further comprises, although not shown, information memory means communication means for communicating with other equipment, a light source for projecting a display screen and optical lens (Fresnel lens) means for focusing the liquid crystal display screen transmitted by the light source to a group of focusing optical lenses to be described later. Numeral 2 denotes a half-mirror input plate which serves as a projection focusing plane for the display screen in an image projection mode as shown in FIG. 1A and reflecting the focused image to further enlarge-project it. As a coordinate input device, the input plate 2 uses a coordinate input plate such as a resistor film type in which two transparent resistor films are laminated so that a contact point of the two films by the pressing by a pen is detected. The resistor film type allows the transparency of higher than semi-transparent to enable viewing of the projection focusing plane of the liquid crystal display screen from the input side. In this sense, a system in which the input plate is not transparent such as an electro-magnetic induction system is not appropriate. Numeral 3 denotes a dedicated input pen (although it need not be dedicated in the resistor film type), numeral 4 denotes a reflection plate which is drawn out in a projection mode, numeral 5 denotes an enlarged image projection screen optionally arranged, and numerals 6 and 7 denotes groups of optical lenses for focusing the image on the input plate 2 and the screen 5, respectively.

An operation of the present embodiment is now explained. The image projection mode is first described. A previously prepared image is displayed on the transmitting type liquid crystal display of the main control unit 1. The image is focused to the optical lenses 6 by the light source and the optical lens (Fresnel lens) means built in the main control unit 1 and focused on a scatter plane of a semi-transparent area of the half-mirror of the input plate 2 by the optical lenses 6. The focused image is viewable by a person who inputs the information on the front side of the input plate 2. The optical operation by the half-mirror is well known in the industries of conventional optical analysis apparatus and automobile head-up displays. In order to attain sharper focused image on the input plate, the surface of the input plate on the input side may be roughed and a back side of the input plate may be a reflection plane to form a half-mirror plane. The operator may input a coordinate by a pen at a point on the image while he/she is watching the focused image. Of course, the input information is displayed on the input plate 2 by the same focusing function with or without the modification by the main control unit 1. In this case, the image may be additionally displayed in overlap with the existing image or only the input information may be displayed. Namely, the operator makes the presentation based on the previously prepared materials and he/she may add appropriate explanation as required, by the function described above. For example, paging of the materials may be registered in association with the gesture of the pen to the input plate 2 so that the paging may be smoothly performed by manipulating the pen.

The image information projected to the input plate 2 is focused by the input plate 2 and also reflected thereby. It passes through the optical lenses 7 and is reflected again by the reflection plate 4 which is drawn out in the projection mode and enlarge-projected to the optionally arranged screen. When the image is focused on the input plate 2 and the screen, it is focused by adjusting mechanisms provided in the optical lenses 6 and 7. Any other appropriate optical means may be additionally provided. For example, the reflection plane of the input plate 2 may be formed by a Fresnel lens so that a distortion of image is suppressed and the size is reduced.

In the image projection mode, the orientation of the image displayed on the liquid crystal display of the main control unit 1 and the orientation of the image projected on the input plate 2 are opposite because the image passes through the optical lenses 6. Accordingly, in the image projection mode, the liquid crystal display of the main control unit 1 displays the image in the opposite orientation. An orientation switch mechanism of the display image is provided in the main control unit 1 so that in the fold mode to be described later, the image is displayed in the normal orientation. The switch mechanism may be separate switch means or linked to a folding mechanism (folding hinge or door), that is, a sensor-microswitch built therein depending on the manner in which the apparatus is used.

In the enlarge-projection of the image projected on the input plate 2 to the screen, the orientation of the image projected on the input plate 2 is inverted by the reflection of the reflection plate 4 and inverted again by the optical lenses 7 so that it is projected to the screen in the same orientation as that of the image projected on the input plate 2.

An operation in the fold mode is now explained. In this mode, the displayed image is not projected and the image displayed on the liquid crystal display of the main control unit 1 is viewed by the operator in the direction shown in FIG. 1C through the semi-transparent input plate 2, and the operator may input to the input plate 2 by a pen while he/she watches the displayed image and the input coordinate is displayed on the liquid crystal display. In the fold mode, since the input plate 2 and liquid crystal display of the main control unit 1 are closely arranged to each other, the fact that the transparency of the input plate 2 is slightly low does not cause a problem. A light intensity of the light source in the main control unit 1 is reduced relative to that in the image projection mode to an extent of a light intensity of a back light of a conventional liquid crystal display. A control mechanism for the light intensity is preferably operated in accordance with the manner in which the apparatus is used as is the switching mechanism for the presentation of the displayed image. Further, the orientation of the displayed image in this mode is switched from the orientation in the image projection mode to the normal orientation by the switching mechanism provided in the main control unit 1 as described above.

Figure 2:
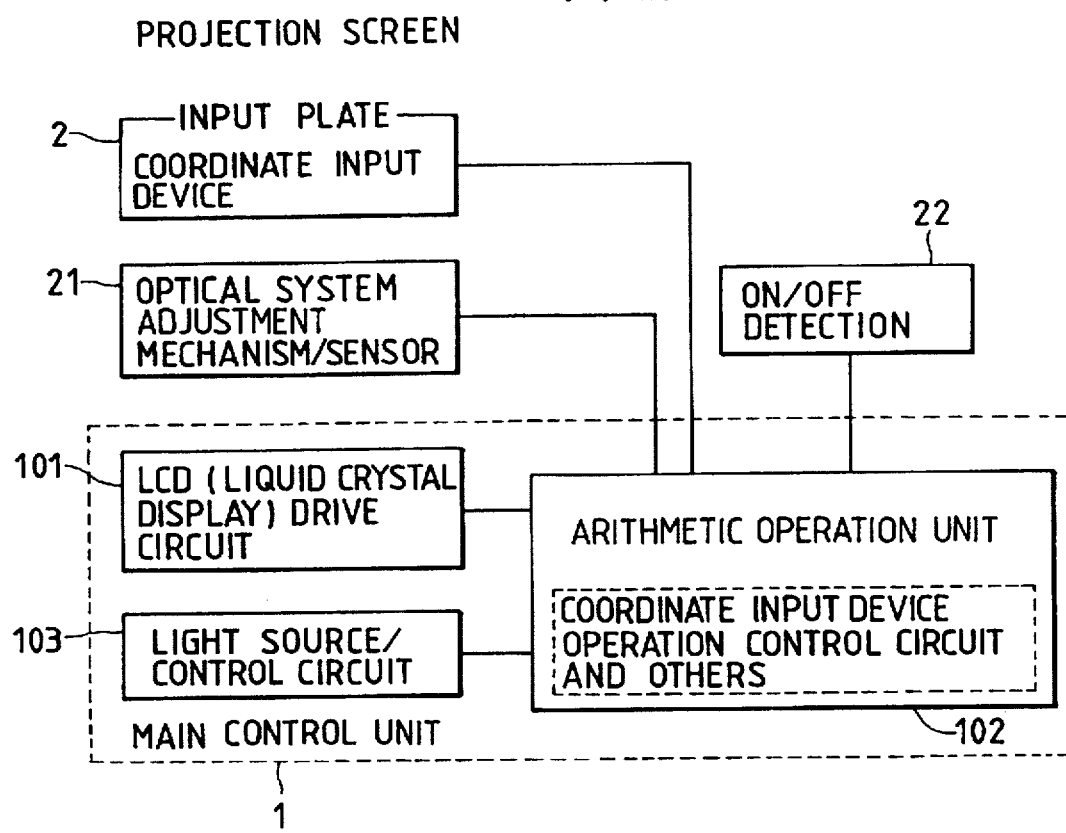
FIG. 2 shows a-block diagram of the apparatus of the embodiment of the present invention.

FIG. 2 shows a block diagram of the functional units of the apparatus of the present embodiment. An arithmetic operation unit 102 controls the overall apparatus. An open/close state detector 22 such as a switch detects the open/close state (FIG. 1A or FIG. 1B) to switch the display state. A light source/control circuit 103 serves as a light source to illuminate the liquid crystal display driven by a liquid crystal display drive circuit 101. An optical system adjusting mechanism/sensor 21 adjusts the optical system such as lenses and mirrors. The input plate 2 adds handwritten images to the displayed image, which is then displayed on the liquid crystal display and projected.

The information processing apparatus of the present embodiment allows the pointing and writing for adding the explanation to the martial in the presentation in the lecture or the conference without previously preparing the sheet material and without projecting the shade of the hand of the presentator and provides the general purpose and portable information processing apparatus which need not be connected with other projection equipment. Further, since the information processing apparatus of the present invention is foldable, it may be used as a conventional input/output integrated information processing apparatus when it is not used for the presentation and the preparation of the materials and the presentation may be conducted by a single apparatus.

[Second Embodiment]

In the above embodiment, the size of the image displayed on the liquid crystal display of the main control unit 1 and the size of the projected image on the input plate 2 were not specifically mentioned, but those two sizes do not always match depending on the projection optical system. A zooming mechanism may be provided in the optical lenses 6 so that the size of the projected image may be changed as desired. In this case, in order to focus the changed size, a mechanism for adjusting a distance between the liquid crystal display and the input plate 2 which is the focusing plane may be provided. In this case, for an operator who inputs to the input plate 2 by a pen to match to the size of the projected image on the input plate 2, a mechanism for changing the size of the input coordinates (system) on the input plate 2 in accordance with a ratio of the size of the projected image on the input plate 2 and the size of the image displayed on the liquid crystal display of the main control unit 1 is provided in the main control unit 1. Namely, when the size of the projected image on the input plate 2 is 3/4 of the size of the image of the liquid crystal display, the input coordinates (system) are multiplied by 4/3 to display it on the liquid crystal display. (The image is displayed on the input plate 2 at the original input coordinate size.) The ratio of the image sizes may be linked to the zooming mechanism of the optical lenses 6 so that it may be automatically controlled in accordance with the projected image on the input plate 2. Further, an area for effectively inputting (detecting) the coordinate (hereinafter referred to as an effective area) in the input plate 2 may be provided (and the input coordinate beyond the effective area is invalidated) and the size of the effective area may be changed in link with the zooming mechanism.

By providing the mechanism for changing the size of the projected image, an appropriate image size may be selected depending on a space of a conference room in which the apparatus is used and the number of people who observe the image, and the application range may be broadened.

In the above arrangement, the operator may present the material while he/she adds input information on the previously prepared image. In the main control unit 1, the preexisting information and the added coordinate information may be separately provided with attributes so that the added information may be independently edited. By adding this function, the writing to the original image may be edited and additionally displayed while the initially projected original image is held. This allows a drawing method similar to that in which an unerasable original image is projected by the OHP and an erasable image by aqueous ink is overwritten thereon.

[Third Embodiment]

A third embodiment of the present invention is now explained. In the above embodiment, the input plate 2 is the resistor film type coordinate input plate. In order to avoid the degradation of the viewability by the spacers between the resistor films and improve the coordiante input precision and the resolution, the input plate may be constructed by an ultrasonic type coordinate input device. The ultrasonic type coordinate input device of the present embodiment is now explained.

In FIG. 3, numeral 8 denotes an arithmetic operation circuit for the coordinate input device for calculating a coordinate-position, built in the main control unit 1. Numeral 9 denotes a vibrator drive circuit built in the main control unit 1 to vibrate a pen tip of a vibration pen 3. Numeral 15 denotes a vibration transmission plate made of a member such as transparent resin plate or glass plate processed as a half-mirror and it is formed by the resin plate 2. The inputting of the coordinate by the vibration pen is conducted by touching on the vibration transmission plate 15. In actuality, pointing is made by the vibration pen 3 within an area A shown by solid lines (hereinafter referred to as an effective area). An anti-vibration material 14 for preventing (reducing) the reflected vibration from returning to a center area is provided on an outer periphery of the vibration transmission plate 15. Vibration sensors 13a to 13d such as piezo-electric elements for converting mechanical vibration to an electrical signal are fixedly attached to an outer periphery of the anti-vibration member 14 or the vibration transmission plate 15. Further, signals of a signal waveform detection circuit 16 corresponding to the vibration sensors 13a to 13d are outputted to the arithmetic operation circuit 8. Numeral 18 denotes a transmission type display capable of displaying dot by dot such as a liquid crystal display built in the main control unit 1.

The vibrator 11 built in the vibration pen 10 is driven by the vibrator drive circuit 9. The drive signal for the vibrator 11 is supplied from the arithmetic operation circuit 8 as a low level pulse signal and amplified with a predetermined gain by the vibrator drive circuit 9 and then applied to the vibrator 11.

The electrical drive signal is converted to a mechanical ultrasonic vibration by the vibrator 11 and it is transmitted to the signal transmission plate 15 through the pen tip 12.

Figure 4:
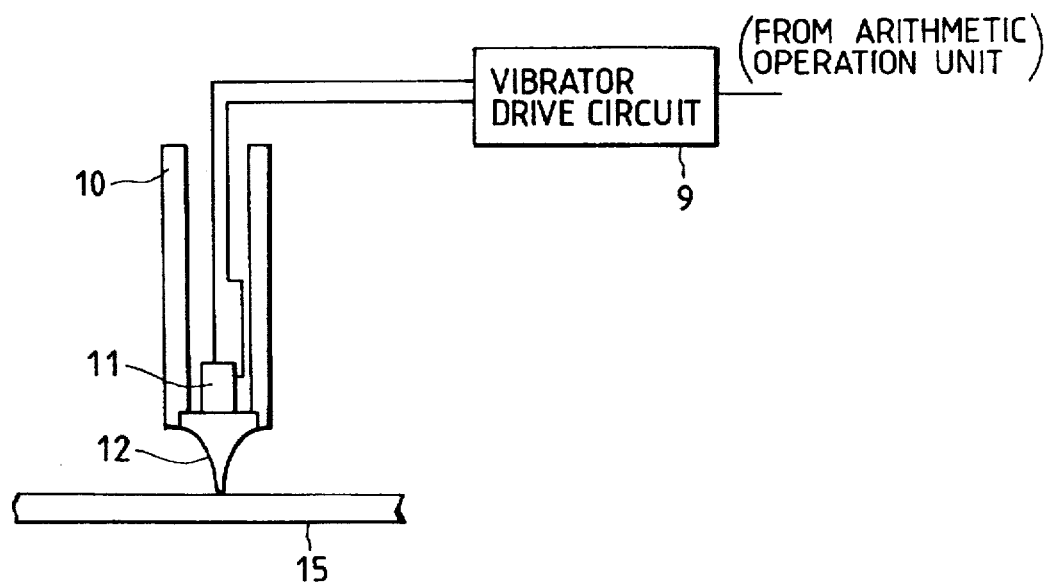
FIG. 4 shows a configuration of a vibration pen.

A vibration frequency of the vibrator 11 is selected to generate a plane wave in the vibration transmission plate 15 such as a glass plate. When the vibrator is driven, a vertical vibration mode for the vibration transmission plate 15 as shown in FIG. 4 is selected. By selecting the vibration frequency of the vibrator 11 to a resonant frequency including the pen tip 12, a high efficiency vibration conversion may be attained.

The elastic wave transmitted to the vibration transmission plate 15 is the plane wave which is less subject to the affect by the defects on the surface of the vibration transmission plate and the obstacles than the surface wave.

In the above arrangement, the arithmetic operation circuit 8 outputs the signal for driving the vibrator 11 in the vibration pen 10 through the vibrator drive circuit 9 at a predetermined interval (for example, 5 ms) and starts to count by an internal timer (comprising a counter). The vibration generated by the resonant pen 10 arrives with delays determined by the distances to the vibration sensors 13a to 13d. The vibration waveform detection circuit 16 detects the signals from the vibration sensors 13a to 13d to generate a signal indicating the vibration arrival timing to the vibration sensors by waveform detection processing to be described later. The arithmetic operation circuit 8 receives the signal for each sensor to detect the vibration arrival times to the vibration sensors 13a to 13d and calculates the coordinate position of the vibration pen.

The arithmetic operation circuit 8 drives the display drive circuit 17 based on the calculated position information of the vibration pen 10, controls the display by the display 18 and outputs the coordinate to an external equipment by the parallel communicaiton (not shown).

The calculated coordinate position information is outputted to the display drive circuit 17 through an I/O port to display a dot at a corresponding position on the display 18. Alternatively, the-coordinate position information may be outputted to an interface circuit through the I/O port to output the coordinate value to an external equipment.

A principle to measure the vibration arrival time to the vibration sensor 13 is now explained.

Figure 5:
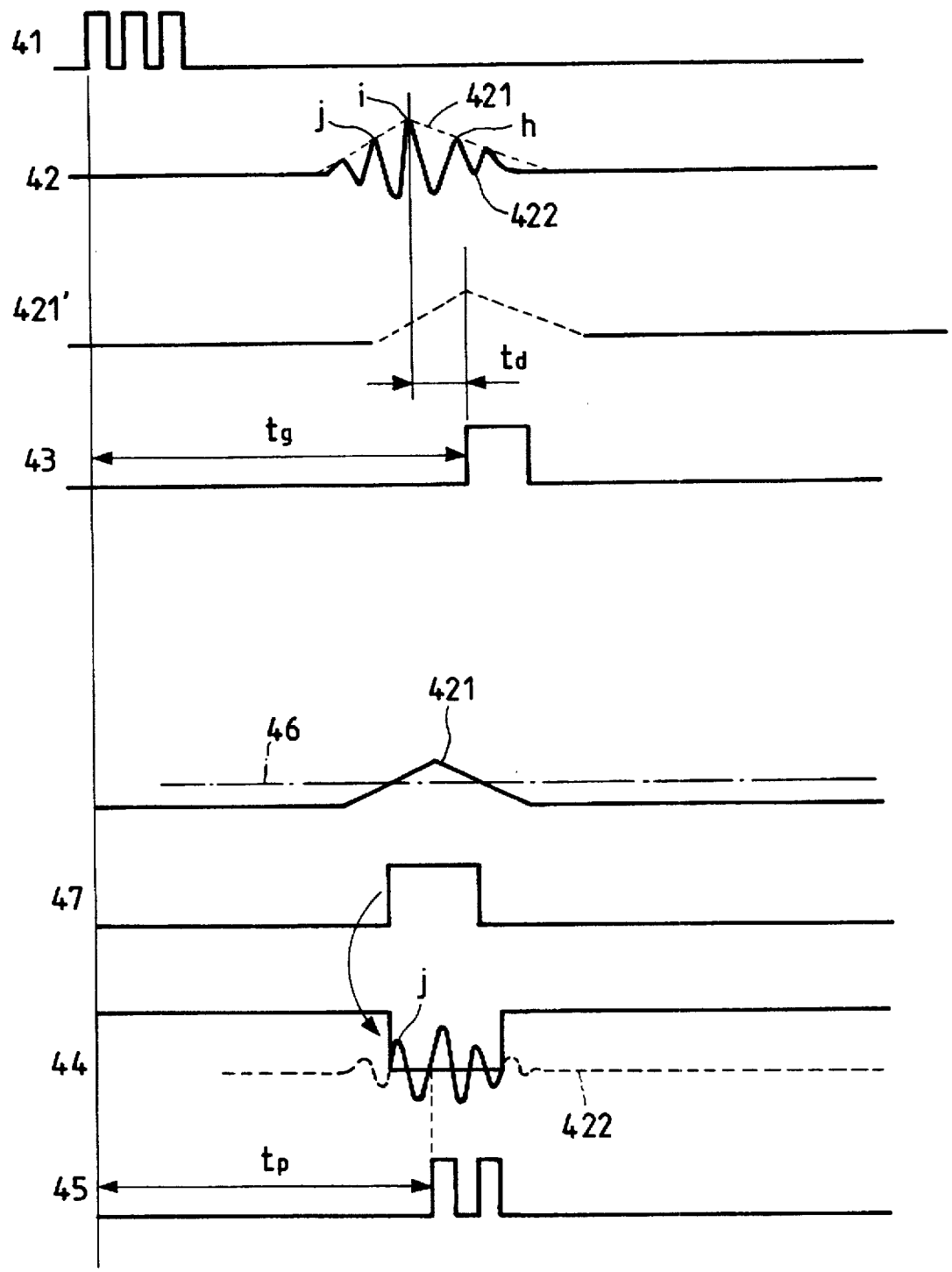
FIG. 5 shows a time chart of vibration processing.

FIG. 5 shows a detection waveform inputted to the signal waveform detection circuit 16 and illustrates the measurement of the vibration transmission time based thereon. The operation for the vibration sensor 13a is described below. The operations for the other vibration sensors 13b, 13c and 13d are identical.

The measurement of the vibration transmission time to the vibration sensor 13a is started simultaneously with the output of a start signal to the vibrator drive circuit 9 as described above. At this time, a drive signal 41 has been applied from the vibrator drive circuit 9 to the vibrator 11. By the signal 41, the ultrasonic vibration transmitted from the vibration pen 10 to the vibration transmission plate 15 propagates for a time tg determined by the distance to the vibration sensor 13a and is detected by the vibration sensor 13a. A signal 42 indicates a signal waveform detected by the vibration sensor 13a.

Since the vibration used in the present embodiment is the plane wave, a relation between an envelope 421 and a phase 422 of the detection waveform for the propagation distance in the vibration transmission plate 8 changes with the transmission distance during the transmission of the vibration. A velocity of the envelope 421, that is, a group velocity is represented by Vg and the phase velocity of the phase 422 is represented by Vp. A distance between the vibration pen 10 and the vibration sensor 13a may be detected based on the group velocity Vg and the phase velocity Vp.

The envelope 421 is first noticed. The velocity is Vg. When a peculiar point on the waveform, for example, an inflection point or a peak of a signal 43 is detected, the distance between the vibration pen 10 and the vibration sensor 13a is given by $$d = Vg \cdot tg \quad (1)$$

where tg is the vibration transmission time. This equation is for the vibration sensor 13a but the same equation may be used to represent the distances between the three other vibration sensors 13b to 13d and the vibration pen 10.

In order to attain more precise coordinate position determination, a process based on the detection of the phase signal is conducted. A time from a particular detection point of the phase waveform signal 422, for example, a vibration application point to a zero-crossing point after a predetermined signal level 461 is represented by tp 45 (which is derived by generating a window signal 44 of a predetermined width for the signal 47 and comparing it with the phase signal 422), the distance between the vibration sensor and the vibration pen is given by $$d = n \cdot \lambda p + Vp \cdot tp \quad (2)$$

where λp is a wavelength of the elastic wave and n is an integer.

From the equations (1) and (2), the integer n is represented by $$n = [(vg \cdot tg - Vp \cdot tp)/\lambda p + 1/N] \quad (3)$$

where N is a real number other than 0. An appropriate number may be used for N. For example, when N=2, n may be determined if the variation of tg is within ±½ wavelength. The n thus derived is substituted in the equation (2) so that the distance between the vibration pen 10 and the vibration sensor 13a may be precisely determined. The generation of the signals 43 and 45 for measuring the vibration transmission time tg and tp is conducted by the vibration waveform detection circuit 9.

Figure 6:
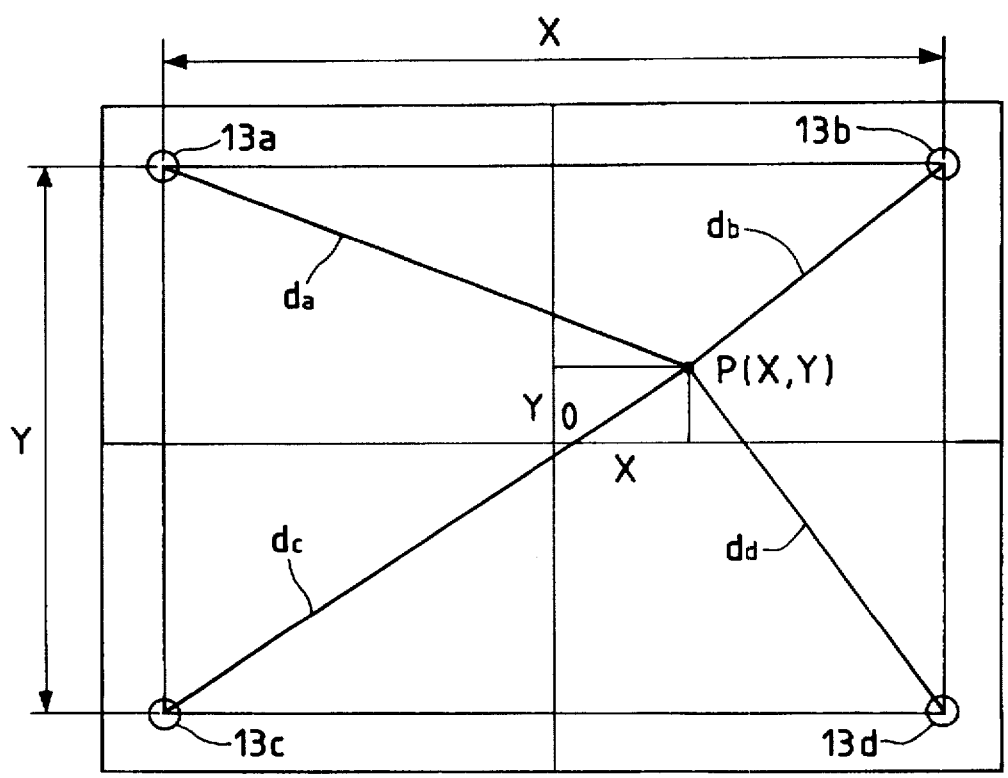
FIG. 6 shows a coordinate system of the coordinate input device.
Figure 7:
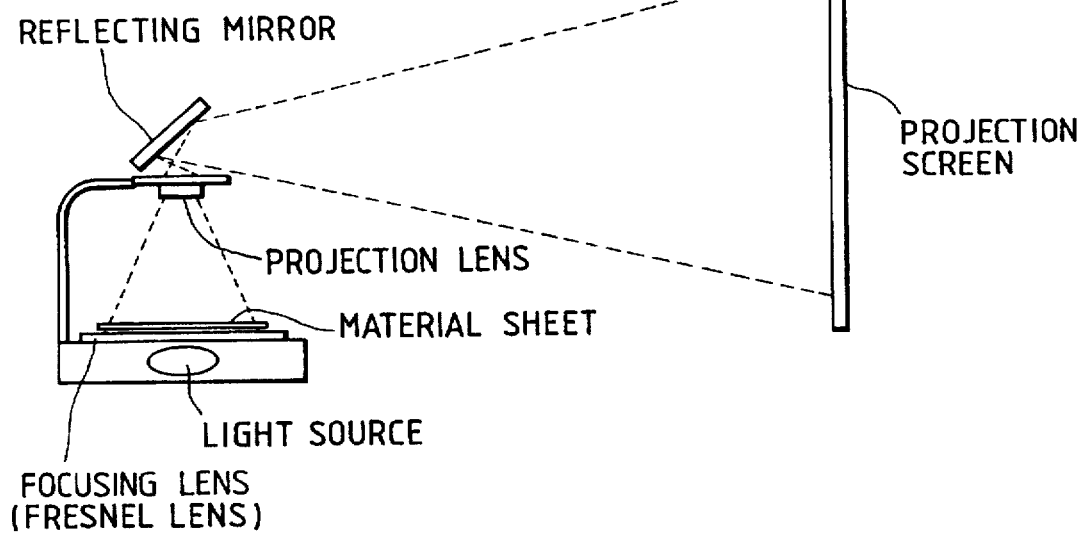
FIG. 7 shows an example of a prior art apparatus.
Figure 8:
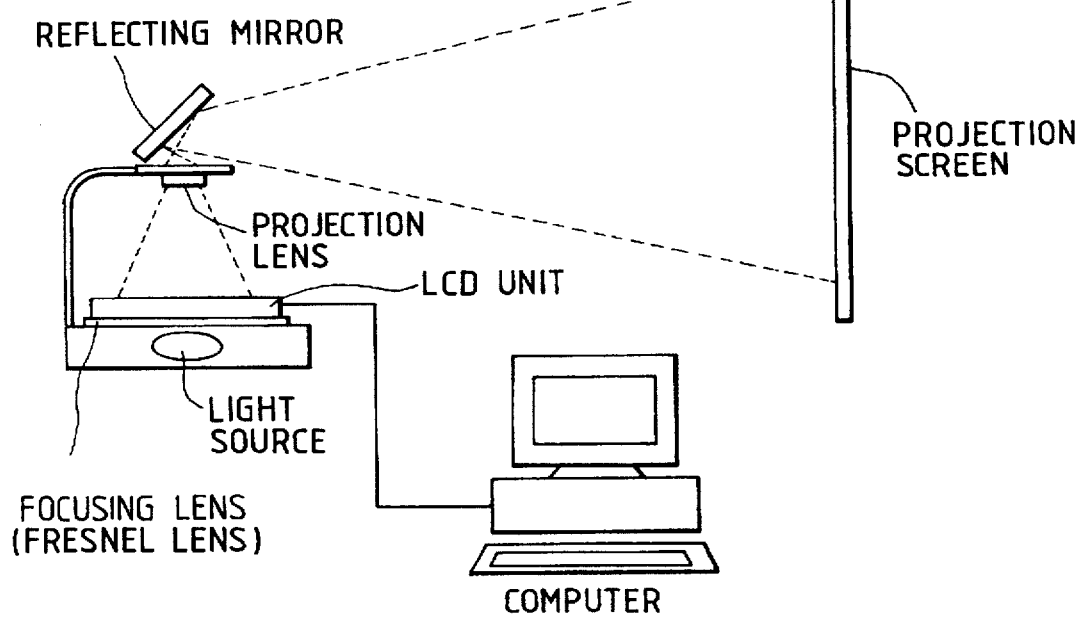
FIG. 8 shows another example of a prior art apparatus.

Referring to FIG. 6, a principle of the coordinate position detection on the vibration transmission plate 15 by the actual vibration pen 10 is now explained. Four vibration sensors 13a to 13d are provided near midpoints of the four sides on the vibration transmission plate 15. Based on the principle described above, the linear distances da to dd between the position P of the vibration pen 10 and the respective vibration sensors 13a to 13d may be determined. The arithmetic operation circuit 8 determines the coordinate (x, y) of the position P of the vibration pen 10 by the three-square theorem based on the linear distances da to dd as follows.

$$x = (da+db) \cdot (da-db)/2X \quad (4)$$

$$y = (dc+dd) \cdot (dc-dd)/2Y \quad (5)$$

where X and Y are distance between the vibration sensors 13a and 13b and the distance between the vibration sensors 13c and 13d, respectively.

In this manner, the position coordinate of the vibration pen 10 may be detected in real time.

By using the coordinate input device described above for the input plate 2 of the information processing apparatus of FIGS. 1A, 1B and 1C or FIG. 2, the degradation of the viewability by the spacers between the resistor films and the coordinate input precision and the resolution are improved relative to those of the resistor film type input plate.

Further, since the coordinate input plane may be formed simply by resin or glass plate, it may be a substantially transparent plate, half-mirror finished or rough finished with fine unevenness on the surface.

In accordance with the information processing apparatus of the present invention, it is not necessary to previously prepare the sheet material, the pointing or writing may be conducted to add the explanation to the material without projecting the shadow of the hand of the presentator, and the apparatus need not be connected with other projection equipment, may be used for general purpose and is highly portable and foldable so that it may be used as a conventional input/output integrated information processing apparatus when it is not used for the presentation. Thus, the single apparatus may be used for the preparation of the material and for the presentation.

By using the input plane as the image projection plane, the parallax between the point pointed by the pens and the display plane is small and the display obstacles such as wires may be eliminated from the input plate.

what is claimed is:

1. An information processing apparatus comprising:
   projection means for protecting an image;
   coordinate input means including a plate having a focusing plane for focusing the image projected by said projection means as a visible image, with said plate formed by a member having a half-mirror surface on the focusing plane, said coordinate input means also simultaneously reflecting the projected image and pointing a position on said plate to input a coordinate;

control means for controlling the image defined by the coordinate inputted by said coordinate input means for the projection by said projection means; and focusing means for focusing the image reflected by said plate on a predetermined projection plane as a visible image.

2. An information processing apparatus according to claim 1, wherein the focusing surface of said plate is semi-transparent or roughened.

3. An information processing apparatus according to claim 1 further comprising housing means for drawing out said plate from a body of said apparatus and housing said plate therein, said plate being superimposed on the body of said apparatus when said plate is housed.

4. An information processing apparatus according to claim 1 wherein said coordinate input means includes vibration generation means, wherein an elastic wave inputted to said plate by said vibration generation means is detected and the position of the vibration source is determined based on a delay time from the input to the detection of the elastic wave.

5. An information processing apparatus according to claim 1 wherein said plate has a construction of lamination of transparent resistor films and said coordinate input means detects a point of contact of the resistor films by the pressure to the plate.

6. An information processing apparatus comprising:

display means having a transmission type display for displaying an image;

coordinate input means serving as a focusing plane of the image displayed by said display means and including a coordinate input plate having a half-mirror surface for reflecting the image;

projection means for illuminating the image of said transmission type display to project the image;

focusing means for focusing the image projected by said projection means to said coordinate input means; and enlarge-projection means for enlarge-projecting the reflected image from said input plate.

7. An information processing apparatus according to claim 6, wherein the focusing surface of said input plate is semi-transparent or roughened.

8. An information processing apparatus according to claim 6, further comprising:

fold detection means for said coordinate input plate;

a reflection plane having a mirror surface for inverting the image in enlarge-projecting the reflected image from the focusing plane of said coordinate input plate;

switch means for switching the inversion of the displayed image in accordance with the detection by said fold detection means; and switch means for switching the light intensity of said light source.

9. An information processing apparatus according to claim 6, further comprising:

optical system adjusting means for changing a size of the focused image of said coordinate input plate and a size of the projected image by said enlarge-projection means;

means for changing the size of the input character image in accordance with a ratio of the size of the focused image and the size of the displayed image changed by said optical system adjusting means; and means for changing an effective area in which the input by said coordinate input means is effective in accordance with the ratio of the size of image.

* * * * *

UNITED STATES PATENT AND TRADEMARK OFFICE
CERTIFICATE OF CORRECTION

PATENT NO. : 5,748,183
DATED : May 5, 1998
INVENTOR(S) : Yoshimura et al.

It is certified that error appears in the above-identified patent and that said Letters Patent is hereby corrected as shown below:

COLUMN 2:

Line 26, "material-to" should read --material to--.

COLUMN 3:

Line 6, "means" should read --means,--.

COLUMN 4:

Line 65, "martial" should read --material--.
Line 67, "shade" should read --shadow--.

COLUMN 6:

Line 8, "coordinate-position," should read
   --coordinate position--.

COLUMN 7:

Line 9, "the-coordinate" should read --the coordinate--.
Line 43, "peculiar" should read --particular--.

UNITED STATES PATENT AND TRADEMARK OFFICE
CERTIFICATE OF CORRECTION

PATENT NO. : 5,748,183

DATED : May 5, 1998

INVENTOR(S) : Yoshimura et al.

It is certified that error appears in the above-identified patent and that said Letters Patent is hereby corrected as shown below:

COLUMN 8:

Line 63, "protecting" should read --projecting--.

COLUMN 9:

Line 14, "claim 1" should read --claim 1,--.
Line 19, "claim 1" should read --claim 1,--.
Line 26, "claim 1" should read --claim 1,--.

COLUMN 10:

Line 9, "roughed." should read --roughened.--.

Signed and Sealed this

Twelfth Day of January, 1999

Attest:

Attesting Officer    *Acting Commissioner of Patents and Trademarks*